E. S. HOWARD.
AUXILIARY TREAD ELEMENT FOR VEHICLE WHEELS.
APPLICATION FILED JAN. 22, 1921.
1,385,918.
Patented July 26, 1921.
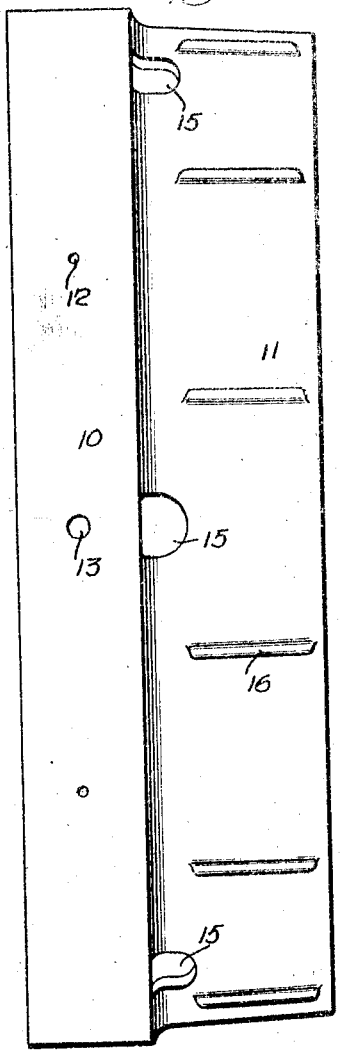
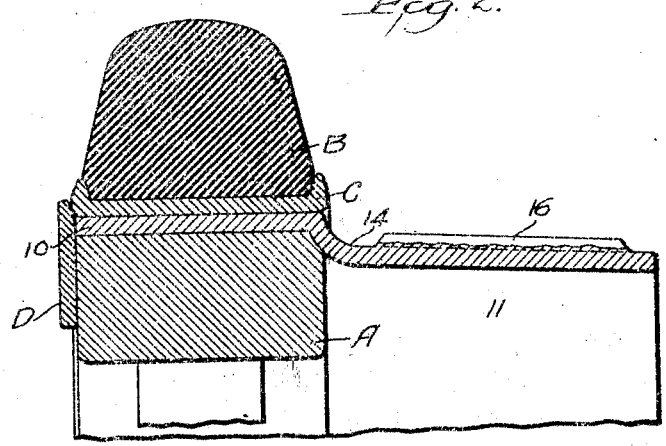
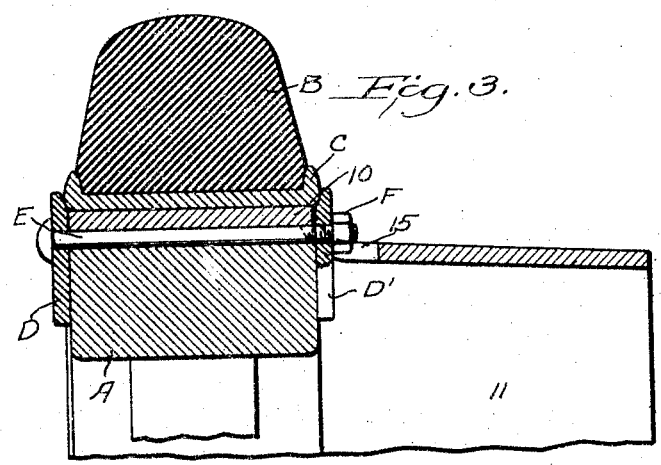
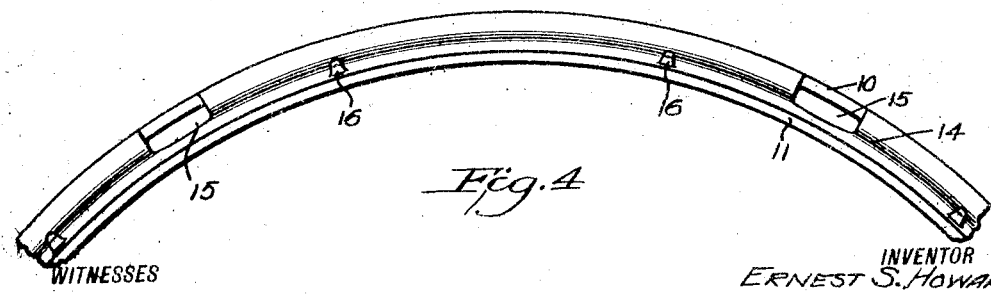
INVENTOR
ERNEST S. HOWARD
BY
ATTORNEYS

UNITED STATES PATENT OFFICE.

ERNEST STAFFORD HOWARD, OF RED BANK, NEW JERSEY.

AUXILIARY TREAD ELEMENT FOR VEHICLE-WHEELS.

1,385,918.

Specification of Letters Patent.   Patented July 26, 1921.

Application filed January 22, 1921.   Serial No. 439,134.

*To all whom it may concern:*

Be it known that I, ERNEST S. HOWARD, a citizen of the United States, and a resident of Red Bank, in the county of Monmouth and State of New Jersey, have invented a new and Improved Auxiliary Tread Element for Vehicle-Wheels, of which the following is a description.

The general object of my invention is to provide an attachment for vehicle wheels more particularly the wheels of automobiles and trucks adapted to be applied to a wheel at the rim and present a lateral annular flange to constitute an auxiliary tread radially inward from and at a side of the tire so that upon the vehicle encountering soft ground and the wheel sinking to the wheel rim, the auxiliary tread will be brought into action and function to materially broaden the effective tread surface and be resistant of further sinking of the wheel.

Reference is to be had to the accompanying drawings forming a part of this specification, it being understood that the drawings are merely illustrative of one example of the invention.

Figure 1 is a side elevation of a wheel attachment embodying my invention;

Fig. 2 is a fragmentary transverse section on an enlarged scale taken through the attachment as applied to a wheel;

Fig. 3 is a view similar to Fig. 2 but the section being taken in a different plane;

Fig. 4 is a fragmentary end view of the attachment.

The attachment in practice is made with an annular portion 10 adapted to embrace the felly A of a wheel and is formed with a lateral annular flange 11, said portion 10 having bolt holes 12 for securing it in position on the felly and it may be further provided as shown with an opening 13 to adapt the attachment to a wheel having an inflatable inner tube, the hole 13 accommodating the tire valve.

In Figs. 2 and 3 the letter A indicates the felly of the wheel; B, the tire, it being understood that any approved tire may be employed; C, the demountable rim; D, a flat ring to retain the rim C at one side of the wheel; D' lugs at the opposite side of the wheel; E, one of the transverse bolts for securing the elements D and D'; and F, the nut on said bolts, the parts thus indicated by reference letters being usual to wheels. The annular portion 10 lies in practice between the felly A and rim C. The tread flange 11 preferably joins the portion 10 on transversely curved lines as indicated at 14 and adjacent to the juncture of the flange and portion 10, the attachment is provided with openings 15 to accommodate the lugs D' and afford convenience in the placing and removal of the lugs and the nut F. The flange 11 at the outer surface is provided with transverse ribs 16.

It will be seen that the flange 11 disposed radially inward from the tread surface of the tire to be normally out of action but upon the wheel sinking beyond the rim C, the flange 11 will function as a tread and traction element to resist the further sinking of the wheel.

Advantageously, in practice, the flange 11 is slightly tapering toward the outer end and is of a diameter less than that of the annular securing portion 10, so as to be radially inward from the rim C permitting the wheel to sink to the rim without bringing the tread flange 11 into action but insuring said flange being brought into action upon the wheel sinking to the felly of the wheel.

I would state in conclusion that while the illustrated example constitutes a practical embodiment of my invention, I do not limit myself strictly to the mechanical details herein illustrated, since manifestly the same can be considerably varied without departure from the spirit of the invention as defined in the appended claim.

Having thus described my invention, I claim:

As a new article of manufacture, an attachment for vehicle wheels comprising an annular securing portion adapted to fit over the felly of a wheel, and a lateral annular flange integral with said securing portion and extending laterally at one side of the same to afford an auxiliary tread surface, said annular flange tapering toward its outer end.

ERNEST STAFFORD HOWARD.